(12) United States Patent
Peattie et al.

(10) Patent No.: US 11,040,868 B2
(45) Date of Patent: Jun. 22, 2021

(54) FLUID COUPLING ASSEMBLY

(71) Applicant: WALNAB PTY LTD, New South Wales (AU)

(72) Inventors: Adam Peattie, New South Wales (AU); Emil-Dan Dragomirescu, New South Wales (AU)

(73) Assignee: WALNAB PTY LTD, New South Wales (AU)

( * ) Notice: Subject to any disclaimer, the term of this patent is extended or adjusted under 35 U.S.C. 154(b) by 0 days.

(21) Appl. No.: 16/099,631

(22) PCT Filed: May 18, 2017

(86) PCT No.: PCT/AU2017/050464
§ 371 (c)(1),
(2) Date: Nov. 7, 2018

(87) PCT Pub. No.: WO2017/197459
PCT Pub. Date: Nov. 23, 2017

(65) Prior Publication Data
US 2019/0152762 A1 May 23, 2019

(30) Foreign Application Priority Data
May 19, 2016 (AU) .............................. 2016901881

(51) Int. Cl.
*F16L 37/34* (2006.01)
*F16L 37/35* (2006.01)
(Continued)

(52) U.S. Cl.
CPC ................ *B67D 7/44* (2013.01); *F16L 37/34* (2013.01); *F16L 37/35* (2013.01); *F16L 37/46* (2013.01); *F16K 21/18* (2013.01); *F16L 37/44* (2013.01)

(58) Field of Classification Search
CPC .. B67D 7/44; F16L 37/46; F16L 37/35; F16L 37/34; F16L 37/44; F16K 21/18
See application file for complete search history.

(56) References Cited

U.S. PATENT DOCUMENTS 4,086,939 A * 5/1978 Wilcox ................... F16L 37/23
                                                                 137/614.03
4,289,164 A     9/1981 Ekman
(Continued)

FOREIGN PATENT DOCUMENTS

CN            1168171 A     12/1997

OTHER PUBLICATIONS

Office Action for China Patent Application No. 201780030273.2 issued by CNIPA dated Jun. 16, 2020.

*Primary Examiner* — Jason K Niesz
(74) *Attorney, Agent, or Firm* — Levenfeld Pearlstein, LLC

(57) ABSTRACT

The present invention relates broadly to a fluid coupling assembly (10) comprising a fluid nozzle sub-assembly (12) arranged to releasably couple to a fluid receiver sub-assembly (14). The fluid nozzle sub-assembly (12) includes a nozzle assembly body (16) defining a pressurised and upstream fluid passageway (18) having a fluid discharge opening (20), and a sleeve (22) slidably mounted to the nozzle body (16) and arranged on sliding movement for opening of the fluid discharge opening (20). The fluid receiver sub-assembly (14) includes a receiver body (26) defining a downstream fluid passageway (28), a hydraulically-actuated poppet valve (30) mounted within the receiver body (26), and a receiver poppet valve (48) including a receiver poppet (54) mounted within the receiver body (26). On coupling of the nozzle sub-assembly (12) to the receiver sub-assembly (14), the following steps occur: 1. the receiver body (26) abuts the sleeve (22) displacing it axially
(Continued)

relative to the nozzle body (16) exposing and thus opening the fluid discharge opening (20) permitting fluid to flow through the upstream fluid passageway (18); 2. the fluid flowing through the upstream fluid passageway (18) enters the downstream fluid passageway (28) hydraulically actuating the hydraulically-actuated poppet valve (30) to open it wherein the fluid flows through the downstream fluid passageway (28) exiting the receiver sub-assembly (14).

18 Claims, 8 Drawing Sheets

(51) Int. Cl.
| | | |
|---|---|---|
| | *B67D 7/44* | (2010.01) |
| | *F16L 37/46* | (2006.01) |
| | *F16K 21/18* | (2006.01) |
| | *F16L 37/44* | (2006.01) |

(56) References Cited

U.S. PATENT DOCUMENTS

| | | | |
|---|---|---|---|
| 5,662,141 | A | 9/1997 | Arosio |
| 5,884,897 | A | 3/1999 | Arosio |
| 6,082,401 | A * | 7/2000 | Braun ............... F16L 37/0841 137/614.03 |
| 6,675,833 | B2 | 1/2004 | Maldavs |
| 7,533,694 | B2 | 5/2009 | Krywitsky |
| 7,591,291 | B2 | 9/2009 | Mackey et al. |
| 8,596,297 | B2 | 12/2013 | Peattie et al. |
| 9,610,838 | B2 | 4/2017 | Ballard et al. |
| 9,708,173 | B2 | 7/2017 | Ballard et al. |
| 2005/0166966 | A1 | 8/2005 | Cortez |
| 2008/0290657 | A1 * | 11/2008 | McKeon, III ......... A61M 39/18 285/328 |
| 2015/0165897 | A1 | 6/2015 | Ballard et al. |

* cited by examiner

FLUID COUPLING ASSEMBLY

This is a National Stage Application of International Patent Application No. PCT/AU2017/050464, filed May 18, 2017, which claims the benefit of and priority to Australian (AU) Patent Application No. 2016901881, filed May 19, 2016, the entireties of which are incorporated fully herein by reference.

TECHNICAL FIELD

The present invention relates broadly to a fluid coupling assembly and relates particularly, although not exclusively, to a quick-connect lubricant coupling assembly. The invention also relates broadly to a fluid receiver sub-assembly of a fluid coupling assembly of a dry-break configuration.

BACKGROUND OF INVENTION

U.S. Pat. No. 4,289,164 is broadly directed to a coupling device for supplying fluid from a pressurised source to an output conduit. The coupling device in its preferred embodiment includes a first coupling part 1 in the form of a female fitting which can be coupled to a second coupling part 2 in the form of male fitting in a quick-coupling arrangement. The female coupling part 1 includes a locking assembly which includes a locking ring 4 and locking ball 5 arranged to interlock with the second male coupling part 2. The female coupling part 1 includes an inner casing 14 which slides axially for opening and closure of a flow passage through the male coupling part 1. This axial sliding of the inner casing 14 is effected by a coaxial outer casing 46 which contacts the male coupling part 2 on coupling of the female and male parts 1 and 2. The female coupling part 1 includes a second valve 18 designed to seal about an outlet of the female coupling part on uncoupling of the male and female parts 2 and 1 respectively. The male coupling part 2 includes a third valve 29 arranged to abut the second valve 18 on coupling of the female and male coupling parts 1 and 2. The third valve 29 also functions to close an inlet of the male coupling part 2 on uncoupling of the assembly.

U.S. Pat. No. 5,884,897 is directed to a quick-action male coupling designed to be connected under pressure. In the preferred embodiment the male half 1 of the quick-action coupling includes a tubular base 3 connected to an adapter 5. The tubular base 3 houses an inner valve 9 which is slidably moved inwardly of the tubular base 3 when it is coupled with a female half 50 of the quick-action coupling. The inner valve 9 contacts a tubular body 20 which also slides inwardly of the tubular base 3 to permit the flow of fluid through the male half 1.

U.S. Pat. No. 6,675,833 is directed broadly to a fluid coupling for connecting fluid lines where a coupler socket (female half) and a nipple (male half) are connected together. In particular, the invention is directed to a quick-connect coupling of a flush-face configuration. In the preferred embodiment the body 112 of the male coupling 110 contacts and displaces an outer sleeve 60 on coupling of the assembly. The outer sleeve 60 contacts and displaces an inner valve sleeve 97 which opens the female coupling to provide fluid flow through a flow passage 64.

U.S. Pat. No. 5,662,141 is directed broadly to a leak-resistant fluid coupling arrangement. In the preferred embodiment a quick coupling 1 includes a female part 2 arranged to connect to a male part 3. The male part 3 on coupling of the assembly contacts and displaces an annular sleeve 9 inwardly of the female part 2. The annular sleeve 9 on continued axial displacement contacts a tubular shutoff body 7 which in turn slidably moves inwardly of the female part 2 to open the female part 2 and permit the flow of fluid. The male coupling part 3 includes a tubular part 15 which on coupling of the assembly contacts a bolt 5 housed centrally of the female part 2. The bolt 5 forces the tubular part 15 inwardly of the male coupling part 3 and opens a valve body 20 associated with the tubular part 15.

These US patents suffer from one or more of the following drawbacks:
1. the force required in coupling the quick-connect parts is excessive because in the course of coupling the male and female parts the fluid (typically incompressible liquid) must be compressed by a reduction in volume in either or both of the male or female parts;
2. the coupling assembly generally requires biasing means in the form of relatively heavy gauge springs which provide effective sealing on uncoupling but require relatively high force in compressing or otherwise displacing on coupling of the female and male coupling parts;
3. relatively low flow rates are provided through the coupling assembly because of either their tortuous or narrow flow paths provided by complicated assemblies and component construction in the male and female coupling parts.

SUMMARY OF INVENTION

According to one aspect of the present invention there is provided a fluid coupling assembly comprising:

a fluid nozzle sub-assembly arranged to releasably couple to a fluid receiver sub-assembly, the fluid nozzle sub-assembly including:
  i) a nozzle body defining a pressurised and upstream fluid passageway having a fluid discharge opening proximal its discharge end, said discharge opening being one of a plurality of radial openings formed by respective of a plurality of radially directed discharge passages within the nozzle body;
  ii) a sleeve slidably mounted to the nozzle body proximal to its discharge end and arranged on sliding movement for opening of the fluid discharge opening,
the fluid receiver sub-assembly including:
  a) a receiver body defining a downstream fluid passageway having an inlet;
  b) a hydraulically-actuated poppet valve mounted within the receiver body;
  c) a receiver poppet valve including a receiver poppet mounted in a normally-closed state within the receiver body proximal the inlet,
the fluid coupling assembly being of a dry-break configuration and during coupling of the fluid nozzle sub-assembly to the fluid receiver sub-assembly:
  1) the nozzle body abuts the receiver poppet displacing it axially relative to the receiver body to effect opening of the inlet of the downstream fluid passageway;
  2) the receiver body abuts the sleeve displacing it axially relative to the nozzle body effecting the sliding movement of the sleeve to expose and thus open the fluid discharge opening of the nozzle body permitting fluid to flow through the upstream fluid passageway and enter the downstream fluid passageway hydraulically actuating the hydraulically-actuated poppet valve to open said poppet valve wherein said fluid flows through the downstream fluid passageway exiting the fluid receiver sub-assembly.

Preferably the sleeve is arranged for sealing closure about the plurality of radial openings. Even more preferably the sleeve is configured relative to the discharge passages so that on the sliding movement of the sleeve for opening of the fluid discharge openings, the volume of pressurised fluid within the discharge passages and contained by the sleeve remains substantially constant.

Preferably the sleeve includes at least one fluid pocket formed in an inside surface of the sleeve at the fluid discharge opening, said fluid pocket designed to assist with closure of the sleeve under the inertia of fluid within the upstream fluid passageway. More preferably the fluid pocket is in the form of a conical frustum surrounding the fluid discharge opening and having a large diameter end located proximal a downstream end of the upstream fluid passageway, the large diameter end at least in part defining a surface of increased drag forces which assists in closing the sleeve. Even more preferably the nozzle body at an upstream edge of the discharge opening includes an undercut to promote the ingress of fluid into a narrow annular channel between the sleeve and the nozzle body, said fluid in the annular channel assisting the sliding movement of the sleeve about the nozzle body.

Preferably the sleeve is in the form of a piston arranged to axially slide along the nozzle body. More preferably the fluid coupling assembly also includes first and second seals mounted internally of the piston proximal to its respective opposite ends and designed to substantially maintain fluid pressure within the upstream fluid passageway on closure of the piston about the discharge opening.

Preferably the fluid nozzle sub-assembly also comprises sleeve biasing means operatively coupled to the sleeve to urge it closed about the discharge opening.

According to another aspect of the invention there is provided a fluid receiver sub-assembly of a fluid coupling assembly of a dry-break configuration, said receiver sub-assembly comprising:
  i) a receiver body defining a downstream fluid passageway having an inlet;
  ii) a receiver poppet valve including a receiver poppet mounted in a normally-closed state within the receiver body proximal the inlet, and a poppet support having a cavity within which the receiver poppet reciprocates for opening and closure of the inlet of the receiver body, the receiver poppet having openings arranged to relieve fluid pressure within the cavity of the poppet support, whereby on coupling of the fluid coupling assembly:
    1) the receiver poppet is displaced axially relative to the receiver body to effect opening of the inlet of the downstream fluid passageway, fluid pressure being relieved from the cavity of the poppet support to the downstream fluid passageway via the openings in the receiver poppet;
    2) fluid entering the downstream fluid passageway flows through the downstream fluid passageway exiting the fluid receiver sub-assembly.

Preferably the fluid receiver sub-assembly also comprises a poppet valve spring housed at least partly within the cavity of the poppet support.

Preferably the poppet support is fixed within the downstream fluid passageway. More preferably the poppet support includes a mounting section secured internally of the receiver body proximal to its outlet, said mounting section including one or more fluid apertures arranged to permit fluid to flow through the downstream fluid passage from outside of the poppet support to the outlet of the receiver body via the fluid apertures.

Preferably the coupling assembly is in the form of a quick-connect coupling assembly. More preferably the quick-connect coupling assembly is of a flush-face design.

BRIEF DESCRIPTION OF DRAWINGS

In order to achieve a better understanding of the nature of the present invention a preferred embodiment of a fluid coupling assembly will now be described, by way of example only, with reference to the accompanying drawings in which.

DETAILED DESCRIPTION

Figure 1:
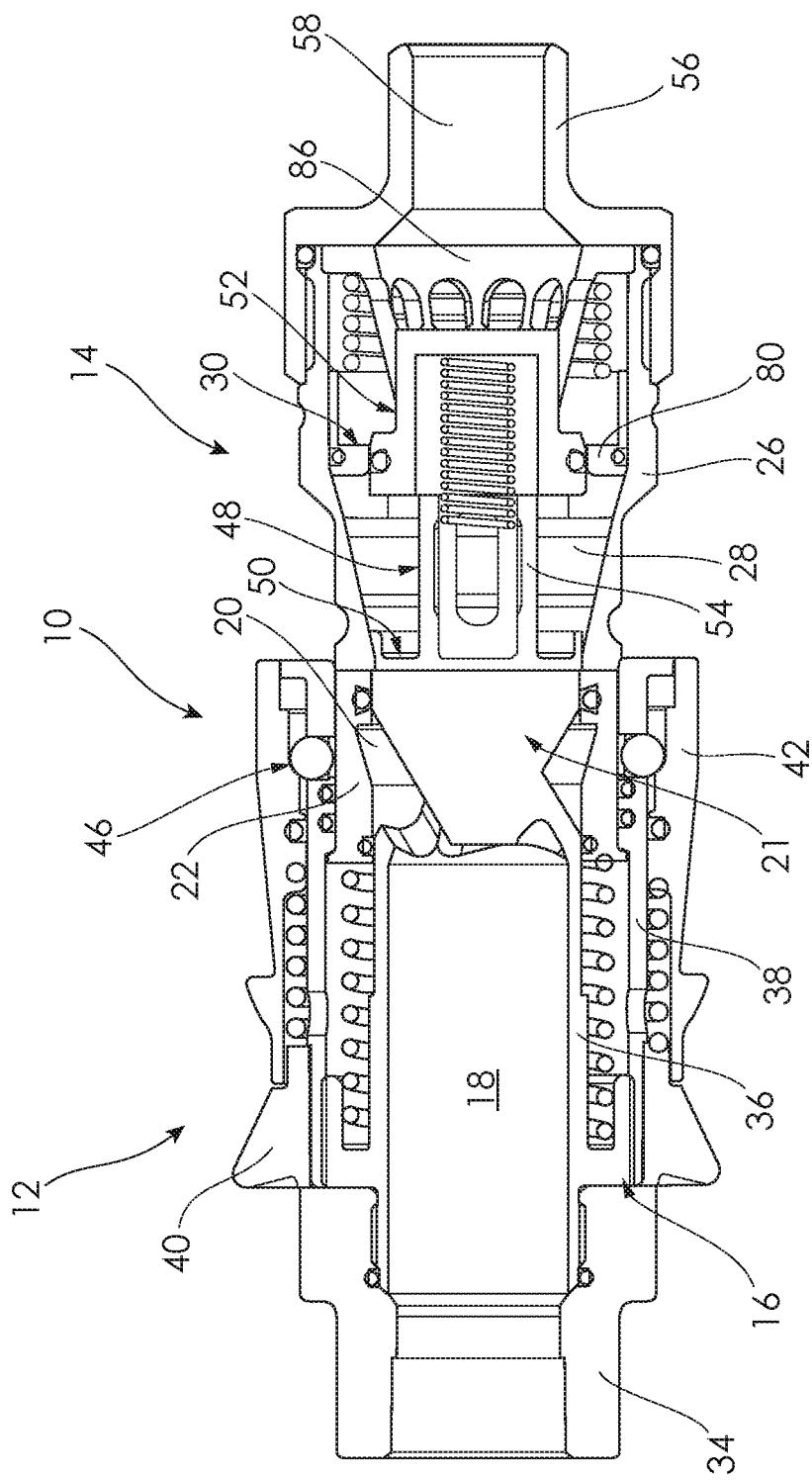
FIG. 1 is a sectional view of a preferred embodiment of a fluid coupling assembly of one aspect of the invention where the fluid nozzle sub-assembly is brought into alignment with the fluid receiver sub-assembly.

As shown in FIGS. 1 to 4 there is according to one aspect of the invention a fluid coupling assembly 10 which in this embodiment is in the form a quick-connect coupling assembly of a flush-face design. The fluid coupling assembly 10 is designed to deliver a range of fluids although this embodiment is specifically suited to lubricants and in particular grease.

The fluid coupling assembly 10 comprises a fluid nozzle sub-assembly 12 arranged to releasably couple to a fluid receiver sub-assembly 14. The nozzle sub-assembly 12 is typically connected to a fluid delivery system including a storage reservoir such as a lubricants reservoir via a supply hose (not shown). The delivery system will generally include a pump designed to supply pressurised fluid to the nozzle sub-assembly 12 together with a shut-off valve associated with the supply hose (not shown). The receiver sub-assembly 14 is typically connected to a fluid recipient in the form of a recipient tank such as a lubricants tank (not shown).

The fluid nozzle sub-assembly 12 of this embodiment includes:
  1. a nozzle assembly body 16 including an inner body 36 defining a pressurised and upstream fluid passageway 18 having a fluid discharge opening 20 proximal its discharge end 21;

2. a sleeve 22 slidably mounted to the nozzle body assembly 16 proximal its discharge end 21 and arranged on sliding movement for opening of the fluid discharge opening 20.

The fluid receiver sub-assembly 14 of this embodiment includes:
1. a receiver body 26 defining a downstream fluid passageway 28 having an inlet 50;
2. a hydraulically-actuated poppet valve 30 mounted within the receiver body 26;
3. a receiver poppet valve 48 including a receiver poppet 54 mounted in a normally-closed state within the receiver body 26 proximal the inlet 50.

Figure 2:
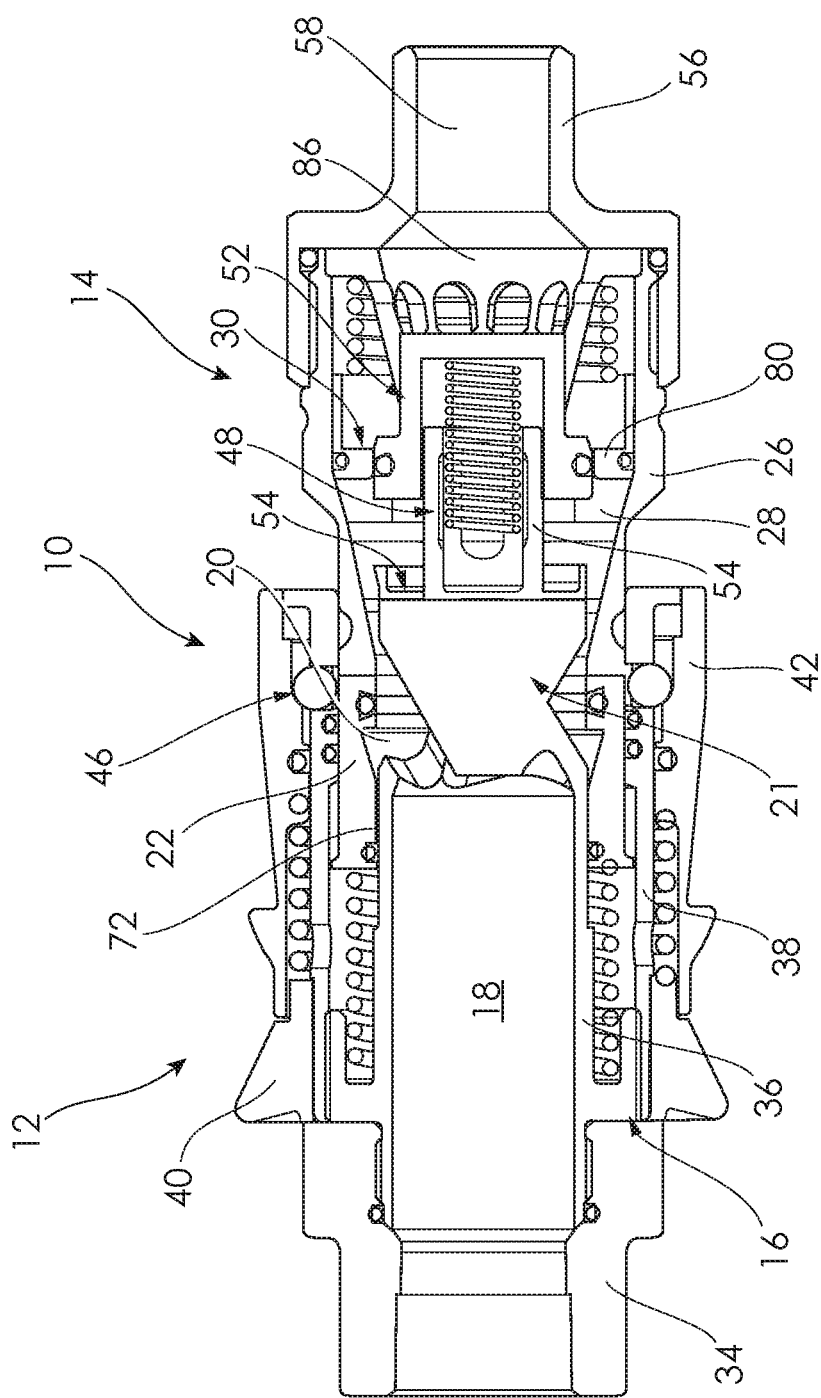
FIG. 2 is a sectional view of the fluid coupling assembly of FIG. 1 at a first stage of coupling the nozzle sub-assembly to the receiver sub-assembly.
Figure 3:
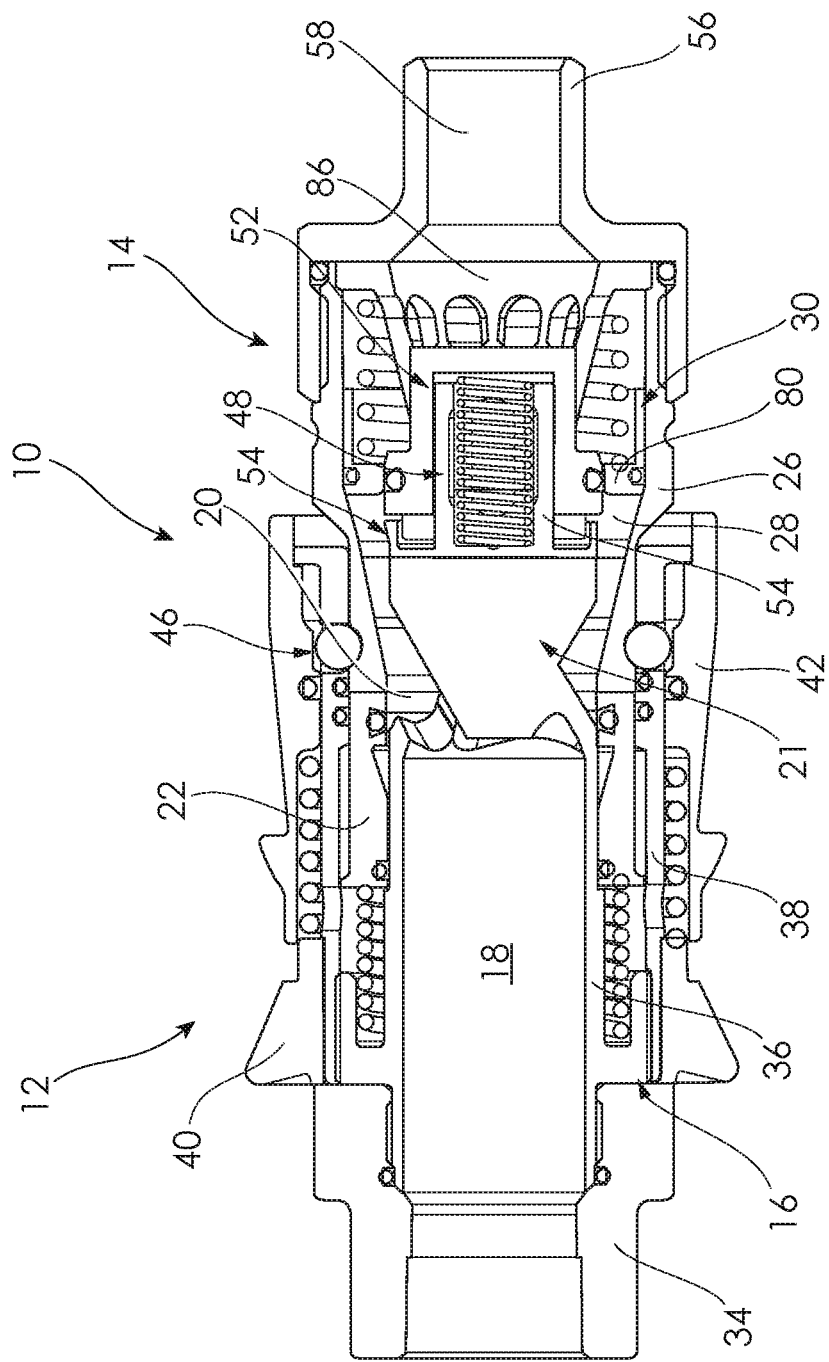
FIG. 3 is a sectional view of the fluid coupling assembly of the preceding figures at a second and final stage of coupling.
Figure 4:
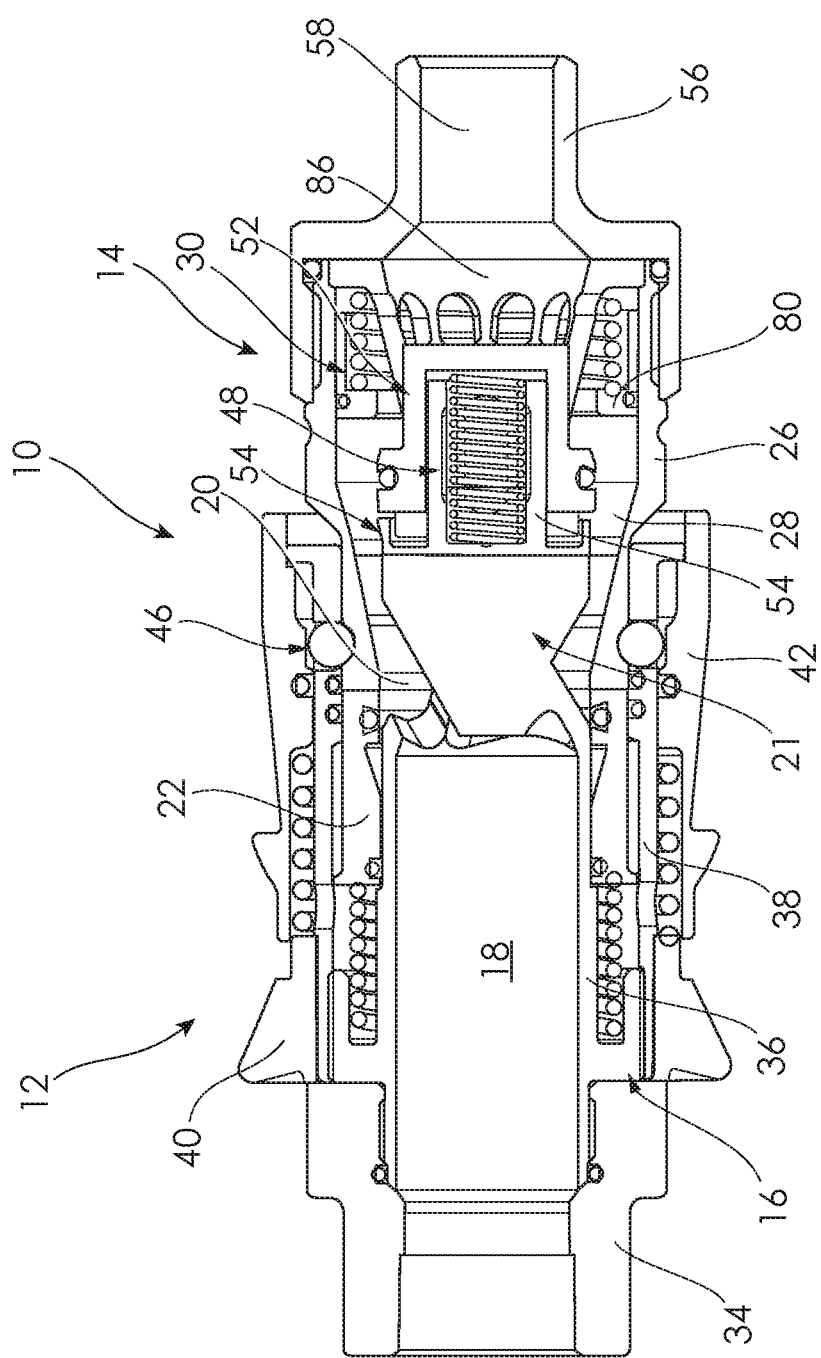
FIG. 4 is a sectional view of the fluid coupling assembly of the preceding figures with the nozzle sub-assembly fully coupled to the receiver sub-assembly and fluid delivery through their respective passageways.

The fluid coupling assembly 10 of this embodiment is of a dry-break configuration and on coupling of the nozzle sub-assembly 12 to the receiver sub-assembly 14 the following steps occur:
1. the receiver body 26 abuts the sleeve 22 displacing it axially relative to the inner body 36, between the aligning and first stages of FIGS. 1 and 2 respectively;
2. further axial displacement of the sleeve 22 exposes and thus opens the fluid discharge opening 20 of the inner body 36 permitting fluid to flow through the upstream fluid passageway 18 as shown in the second or final stage of FIG. 3;
3. the fluid flowing through the upstream fluid passageway 18 enters the downstream fluid passageway 28 as shown in FIG. 3;
4. the fluid within the downstream fluid passageway 28 hydraulically actuates the hydraulically-actuated poppet valve 30 to open it wherein the fluid flows through the downstream fluid passageway 28 exiting the receiver sub-assembly 14 via an exit outlet 58 as shown in FIG. 4.

The fluid nozzle sub-assembly 12 of this embodiment also includes a tail fitting 34 screwed or otherwise connected to the inner body 36 and providing coupling to the supply hose (not shown). The nozzle body assembly 16 of this example includes the inner body 36 which connects coaxial with the tail fitting 34, and an outer body 38 fixed to the inner body 36. The outer body 38 supports a collar 40 which assists an operator in handling the nozzle sub-assembly 12, particularly when coupling it to the receiver sub-assembly 14. The nozzle sub-assembly 12 also includes an actuator 42 which slidably mounts about the outer body 38 and is axially biased outward of the nozzle sub-assembly 12 via actuator spring 44. The actuator 42 cooperates with a ball lock mechanism 46 designed to provide inter-engagement between the nozzle sub-assembly 12 and receiver sub-assembly 14 upon their coupling in a conventional manner.

The fluid receiver sub-assembly 14 of this embodiment also includes a receiver poppet valve 48 mounted with the receiver body 26 adjacent its inlet 50. The receiver poppet valve 48 includes a poppet support 52 within which a secondary poppet 54 reciprocates for opening and closure of the inlet 50 of the receiver body 26. The poppet support 52 is fixed within the downstream fluid passageway 28 and also provides an internal mounting for the hydraulically-actuated poppet valve 30.

In coupling of the fluid nozzle sub-assembly 12 to the fluid receiver sub-assembly 14, the receiver poppet 54 is contacted by the inner body 36 of the nozzle body 16 wherein the receiver poppet 54 is axially displaced relative to the poppet support 52. This axial displacement of the receiver poppet 54 effects opening of the inlet 50 to provide fluid within the downstream fluid passageway 28 which, as described earlier, hydraulically-actuates the hydraulically actuated poppet valve 30.

The fluid receiver sub-assembly 14 includes a receiver tail 56 connected to and provided coaxial with the receiver body 26. The receiver tail 56 includes the exit outlet 58. It will be appreciated that the receiver tail 56 is screwed or otherwise coupled directly or indirectly to the fluid recipient tank (not shown), In this embodiment the discharge opening 20 is one of a plurality of radial openings such as 20a shown best in FIG. 5. The radial openings such as 20a are formed by respective of a plurality of radially directed discharge passages 60a and 60b within the inner body 36 of the nozzle body assembly 16. These radial discharge passages 60a and 60b are located at the discharge end 21 of the inner body 36 and formed continuous with the pressurised upstream fluid passageway 18.

The sleeve 22 is in this embodiment in the form of a piston and is arranged for sealing closure about the plurality of radial openings such as 20a. Importantly the piston 22 is configured relative to the discharge passages 60a/b so that on sliding movement of the piston 22 for opening of the fluid discharge openings such as 20a, the volume of pressurised fluid within the discharge passages 60a/b and contained by the piston 22 remains substantially constant. The piston 22 is thus axially displaced with relative ease without requiring compression of the fluid which is typically an incompressible liquid.

Figure 5:
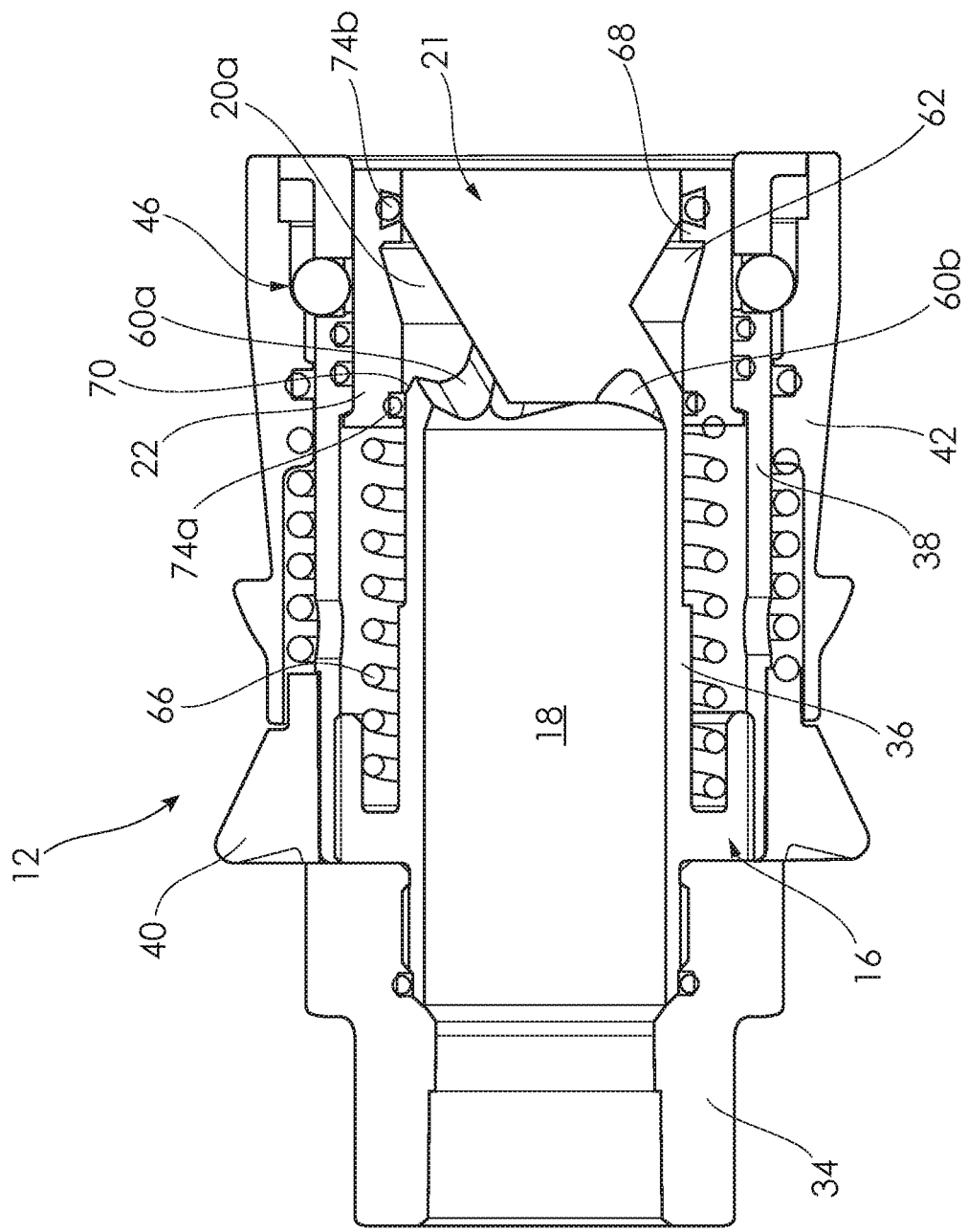
FIG. 5 is a sectional view of one embodiment of a fluid nozzle sub-assembly taken from the fluid coupling assembly of the preceding figures.

As best seen in FIG. 5 the sleeve or piston 22 includes a fluid pocket 62 formed in its inside surface and surrounding the discharge openings such as 20a with the piston 22 closed. The fluid pocket 62 is configured to assist with closure of the piston 22 under the inertia of fluid within the upstream fluid passageway 18 and in particular the plurality of radial discharge passages 60a/b. This hydraulic closure of the piston 22 is beneficial during uncoupling of the fluid nozzle sub-assembly 12 from the fluid receiver sub-assembly 14. In this example the fluid pocket 62 is formed in the piston 22 in the shape of a conical-frustum. The large diameter end of the frustum-shaped fluid pocket 62 is located proximal to the downstream end of the upstream fluid passageway 18. The large diameter end thus provides a surface 68 of increased drag forces which assists in closing the sleeve or piston 22.

The fluid nozzle sub-assembly 12 in this embodiment includes sleeve biasing means in the form of sleeve spring 66 operatively coupled to the sleeve or piston 22 to urge it closed about the discharge openings such as 20a. The combined biasing action of the sleeve spring 66 and the hydraulic or drag forces via the fluid pocket 62 means the spring 66 can apply a relative low biasing force to the sleeve or piston 22. This is advantageous because it means that less resistance is provided by the first sleeve spring 66 on coupling of the fluid nozzle sub-assembly 12 to the fluid receiver sub-assembly 14.

Figure 6:
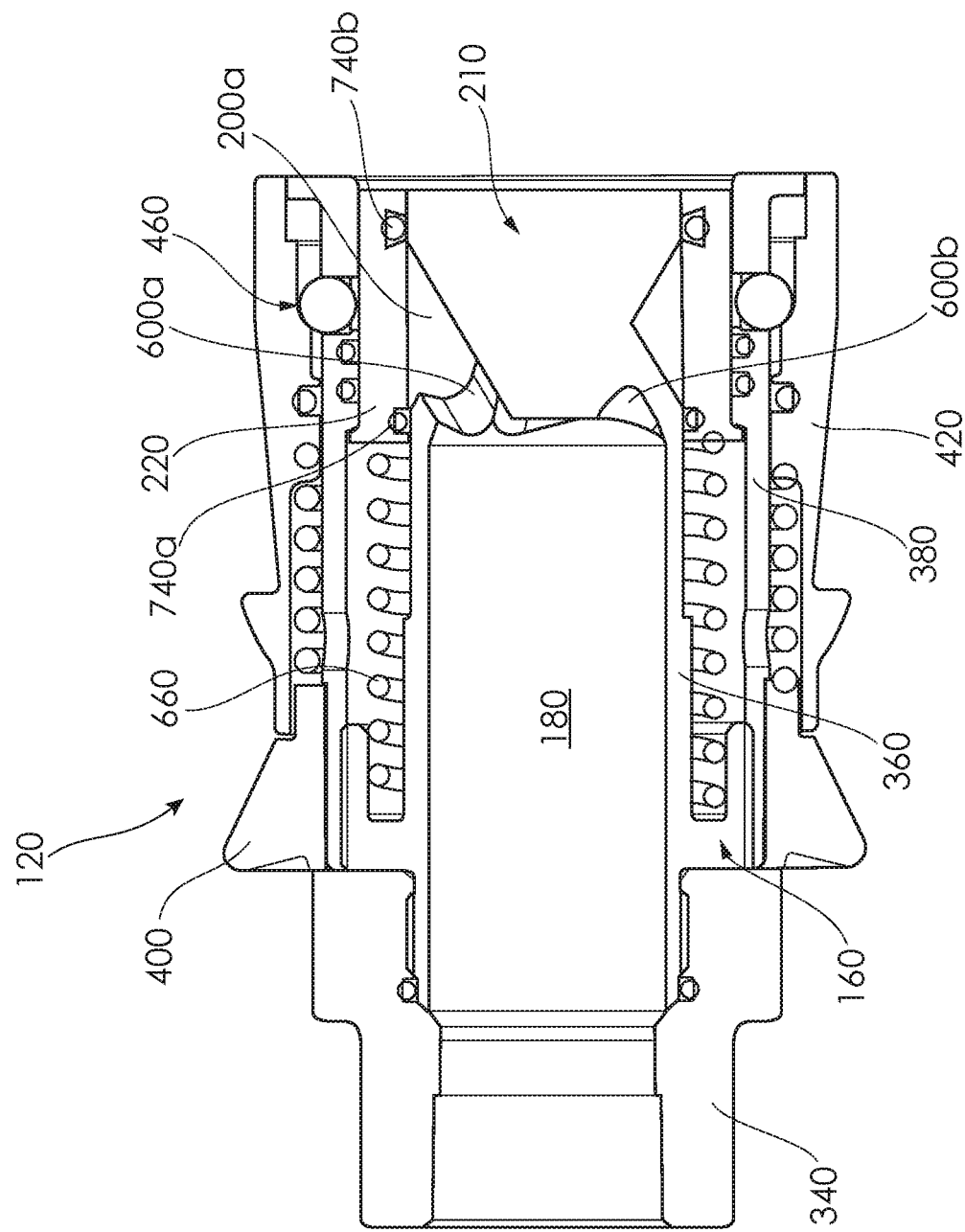
FIG. 6 is a sectional view of an alternative embodiment of a fluid nozzle sub-assembly taken from a fluid coupling assembly according to this aspect of the invention.

FIG. 6 is a sectional view of an alternative embodiment of a nozzle sub-assembly 120 suitable for use with a receiver sub-assembly such as 14 of the fluid coupling assembly 10 of the previous aspect of the invention. This alternative nozzle sub-assembly 120 is similar to the nozzle sub-assembly 12 of the preceding aspect except that the sleeve or piston 220 does not include a fluid pocket formed in its inside surface. For ease of reference and in order to avoid repetition, the components of this alternative fluid nozzle sub-assembly 120 which generally correspond to the preceding embodiment have been indicated with an additional "0". For example, the body is designated at 160 and the pressurised upstream passage designated at 180.

As best shown in FIG. 5 the fluid nozzle sub-assembly 12 includes a slight undercut 70 within the inner body 36 of the nozzle body assembly 16. The undercut 70 is formed at an upstream edge of each of the discharge openings such as 20*a*. This undercut 70 promotes the ingress of pressurised fluid into a narrow annular channel 72 (see FIG. 2) between the sleeve 22 and the inner body 36 of the fluid nozzle body assembly 16. The fluid entering this annular channel 72 assists in sliding movement of the sleeve 22 about the inner body 36. The nozzle sub-assembly 12 includes first and second sleeve seals 74*a* and 74*b* mounted internally of the sleeve 22 proximal to its respective opposite ends. The first and second seals 74*a* and 74*b* function so that with the sleeve or piston 22:
1. closed they prevent leakage of pressurised fluid so as to substantially maintain fluid pressure within the upstream fluid passageway 18;
2. open the first seal 74*a* contains the pressurised fluid within the annular channel 72 wherein it functions as a lubricant for the first and second seals 74*a* and 74*b* in their sliding movement across the inner body 36 during opening and closure of the sleeve or piston 22 (see FIG. 3).

This sealing arrangement for the sleeve 22 together with the annular channel 72 combines to reduce the friction or sliding resistance between the sleeve 22 and the inner body 36 of the nozzle body assembly 16. The sleeve spring 66 is thus required to provide less biasing force in promoting closure of the sleeve 22 on uncoupling of the fluid nozzle sub-assembly 12 from the fluid receiver sub-assembly 14. This also means the sleeve 22 axially slides along the inner body 36 with relative ease during coupling of the fluid nozzle sub-assembly 12 to the fluid receiver sub-assembly 14. The quick-connect coupling assembly 10 of this embodiment thus requires reduced effort by an operator in manually aligning and coupling the fluid nozzle sub-assembly 12 to the fluid receiver sub-assembly 14.

FIG. 2 best illustrates operation of the fluid receiver sub-assembly 14 at an intermediate stage of either coupling or uncoupling of the fluid nozzle sub-assembly 12. The hydraulically-actuated poppet valve 30 includes a cylindrical body 78 (see FIG. 7) formed integral with a poppet head 80. The cylindrical body 78 is configured to reciprocate within the receiver body 26. The fluid receiver sub-assembly 14 includes biasing means in the form of poppet valve spring 77 arranged to urge the poppet head 80 of the hydraulically-actuated poppet valve 30 closed about the poppet support 52.

Figure 7:
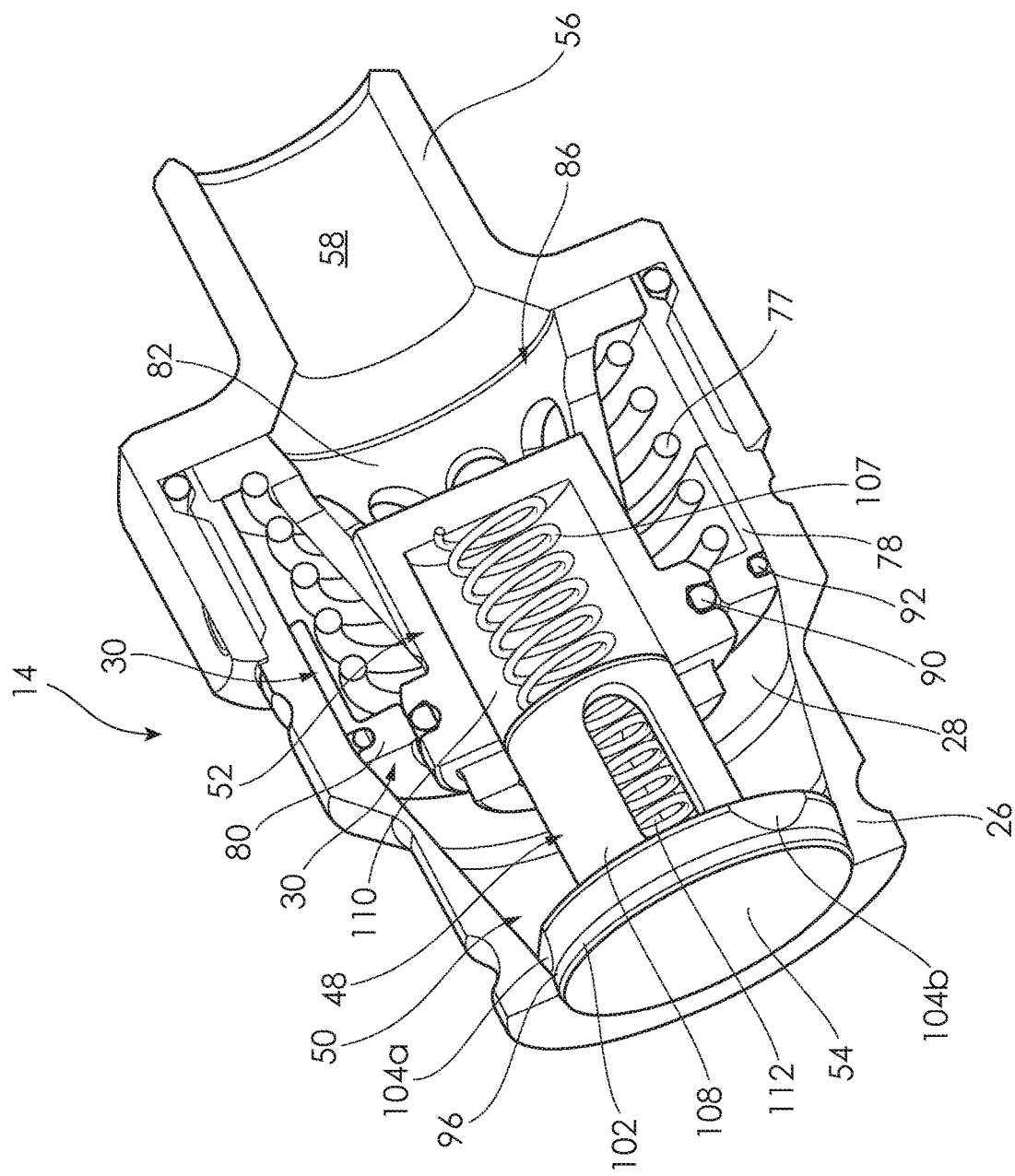
FIG. 7 is a detailed perspective view shown in part section of the fluid receiver sub-assembly of another aspect of the invention taken from the coupling assembly of FIGS. 1 to 4.
Figure 8:
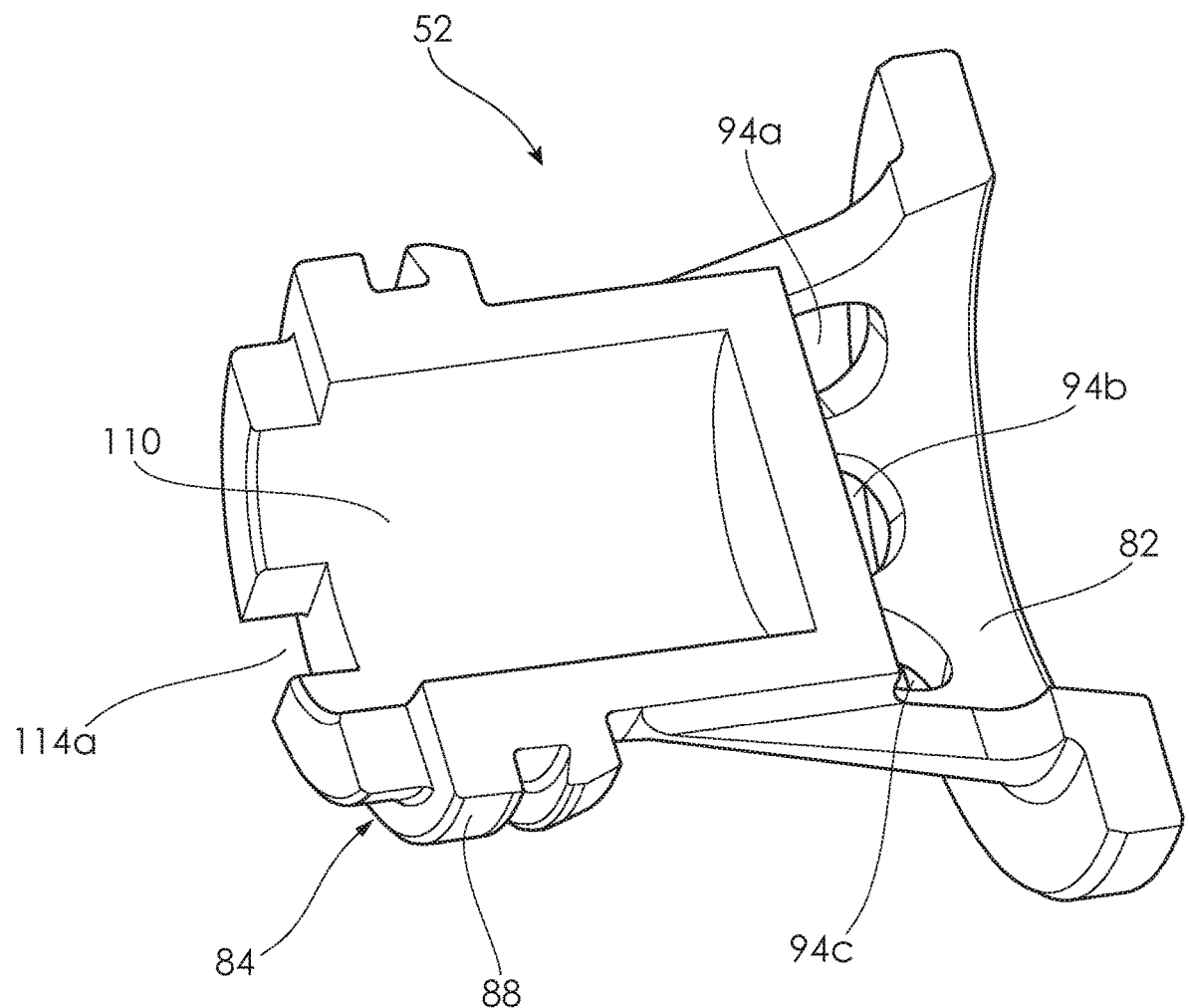
FIG. 8 is a perspective view shown in part cutaway of the poppet support removed from the receiver sub-assembly of the preceding figures.

As best seen in FIGS. 7 and 8 the poppet support 52 includes a frusto-conical mounting section 82 having an enlarged head 84 at its upstream or small diameter end. The large diameter or downstream end of the conical mounting section 82 is secured internally of the receiver body 26 at its outlet 86. The enlarged head 84 includes a perimeter surface 88 and an associated seal 90 for seating with the poppet head 80 of the hydraulically-actuated poppet valve 30 on its closure. The hydraulically-actuated poppet valve 30 also includes an outer seal 92 mounted within an outer surface of the poppet head 80 and designed to seal within an inside surface of the receiver body 26.

The poppet support 52 is also configured wherein its mounting section 82 includes one or more fluid apertures such as 94*a* to 94*c* arranged to permit fluid to flow through downstream fluid passage 28 from outside of the poppet support 52 to inside of the poppet support 52 via the fluid apertures such as 94*a*.

Thus, on coupling of the nozzle sub-assembly 12 to the receiver sub-assembly 14 and subsequent opening of the hydraulically-actuated poppet valve 30, the fluid exits the receiver sub-assembly 14 via the outlet 86.

As seen in FIG. 7 the fluid receiver sub-assembly 14 also includes a bleed passage 96 between the receiver poppet valve 48 and the receiver body 26 proximal its inlet 50. The bleed passage 96 is configured on closure of the receiver poppet valve 48 to relieve any potential residual pressure from the downstream fluid passage 28 on an upstream side of the hydraulically-actuated poppet valve 30. The bleed passage 96 is formed by a combination of:
1. a bevelled edge or chamfer 102 formed in the head 100 of the receiver poppet 48;
2. a plurality of flat regions or cut-outs such as 104*a* and 104*b* milled or otherwise removed from the head 100 of the receiver poppet 48;
3. the radial clearance between the milled flat regions such as 104*a* and 104*b*, and the surrounding receiver body 26 at the opening 50.

In this embodiment the receiver poppet 48 includes a receiver poppet spring 107 housed within a cylindrical section 108 of the secondary poppet 48 and a corresponding cavity 110 at an upstream end of the poppet support 52. The cylindrical section 108 includes slotted openings 112 which provide for venting of the cavity 110 during opening of the receiver poppet 48. At the limit of travel for the receiver poppet 48 (see FIG. 3), the cavity 110 vents via circumferentially spaced cutouts such as 114 formed in the poppet support 52 at its head 84. This combination of features ensures no additional resistance caused by fluid compression within the cavity 110 is present which would otherwise mean additional force is required in coupling the nozzle sub-assembly 12 to the receiver sub-assembly 14, that is in axially displacing the receiver poppet 48.

In accordance with another aspect of the invention there is provided a fluid receiver sub-assembly such as 14 of the preceding embodiment. The receiver sub-assembly 14 is part of a fluid coupling assembly such as 10 and is of a dry-break configuration. The fluid receiver sub-assembly 14 may cooperate with a fluid nozzle sub-assembly such as 12 of the preceding embodiment or an alternative nozzle sub-assembly to which it can releasably couple.

Now that a preferred embodiment of the invention has been described it will be apparent to those skilled in the art that the fluid coupling assembly has at least the following advantages over the admitted prior art:
1. the coupling assembly in the course of coupling the fluid nozzle sub-assembly to the fluid receiver sub-assembly minimises fluid compression which might otherwise result in hydro-locking and therefore reduces operator effort in mechanically coupling the assembly;
2. the fluid nozzle sub-assembly reduces biasing and in particular spring resistances and friction between relative moving parts whereby operator effort in coupling the assembly is reduced;
3. the fluid receiver sub-assembly is effective in operation being of a dry-break configuration and including a hydraulically-actuated poppet valve;
4. the fluid receiver sub-assembly including the hydraulically-actuated poppet valve allows for coupling without undue force when the downstream passage or tank has residual pressure.

Those skilled in the art will appreciate that the invention described herein is susceptible to variations and modifications other than those specifically described. For example, the male and female configuration of the fluid receiver sub-assembly and the fluid nozzle sub-assembly respectively may be reversed. The upstream and/or downstream flow passageways may be reconfigured or reoriented provided functionally the fluid coupling assembly operates as broadly defined. For example, the hydraulically-actuated poppet valve may cooperate with a central flow passage rather than the annular flow passage located outside the poppet support. All such variations and modifications are to be considered within the scope of the present invention the nature of which is to be determined from the foregoing description.

The invention claimed is:

1. A fluid coupling assembly comprising:
a fluid nozzle sub-assembly arranged to releasably couple to a fluid receiver sub-assembly, the fluid nozzle sub-assembly including:
  i) a nozzle body defining a pressurised and upstream fluid passageway having a fluid discharge opening proximal its discharge end, said discharge opening being one of a plurality of radial openings formed by respective of a plurality of radially directed discharge passages within the nozzle body;
  ii) a sleeve sub-assembly slidably mounted to the nozzle body proximal to its discharge end and arranged on sliding movement for opening of the fluid discharge opening,
the fluid receiver sub-assembly including:
  a) a receiver body defining a downstream fluid passageway having an inlet;
  b) a receiver poppet valve including a receiver poppet mounted at a proximal end in a normally-closed state within the receiver body at the inlet, and a poppet support having a cavity within which the receiver poppet, i) in its normally-closed state and at its distal end is directly retained, and ii) is axially displaced from its normally-closed state for opening of the inlet, the receiver poppet having openings arranged to relieve fluid pressure within the cavity of the poppet support during said axial displacement of the receiver poppet for opening of the inlet,
the fluid coupling assembly being of a dry-break configuration and during coupling of the fluid nozzle sub-assembly to the fluid receiver sub-assembly:
  1) the nozzle body abuts the receiver poppet displacing it axially relative to the receiver body to effect opening of the inlet at the upstream end of the downstream fluid passageway;
  2) the receiver body abuts the sleeve sub-assembly displacing it axially relative to the nozzle body effecting the sliding movement of the sleeve sub-assembly to expose and thus open the fluid discharge opening of the nozzle body permitting fluid to flow through the upstream fluid passageway and enter the downstream fluid passageway wherein said fluid flows through the downstream fluid passageway exiting the fluid receiver sub-assembly.

2. The fluid coupling assembly as claimed in claim 1 wherein the sleeve sub-assembly is arranged for sealing closure about the plurality of radial openings.

3. The fluid coupling assembly as claimed in claim 1 wherein the sleeve sub-assembly is configured relative to the discharge passages so that on the sliding movement of the sleeve sub-assembly for opening of the fluid discharge openings, the volume of pressurised fluid within the discharge passages and contained by the sleeve sub-assembly remains substantially constant.

4. The fluid coupling assembly as claimed in claim 1 wherein the fluid nozzle sub-assembly also comprises sleeve sub-assembly biasing means operative coupled to the sleeve sub-assembly to urge it closed about the discharge opening.

5. The fluid coupling assembly as claimed in claim 1 wherein the poppet support includes a frusto-conical mounting section secured internally of the receiver body proximal its outlet, said mounting section including one or more fluid apertures arranged to permit fluid to flow through the downstream fluid passage from outside of the poppet support to inside of the poppet support via the fluid apertures.

6. The fluid coupling assembly as claimed in claim 1 wherein the sleeve sub-assembly is in the form of a piston arranged to axially slide along the nozzle body.

7. The fluid coupling assembly as claimed in claim 6 also including first and second seals mounted internally of the piston proximal its respective opposite ends and designed to substantially maintain fluid pressure within the upstream fluid passageway on closure of the piston about the discharge opening.

8. The fluid coupling assembly as claimed in claim 1 wherein the fluid receiver sub-assembly also includes a bleed passage between a head of the receiver poppet and the receiver body proximal to its inlet, the bleed passage configured to permit the relief of any residual pressure from the downstream fluid passageway.

9. The fluid coupling assembly as claimed in claim 8 wherein the bleed passage is formed at least in part by a plurality of circumferentially spaced flat regions or cutouts removed from the head of the receiver poppet.

10. The fluid coupling assembly as claimed in claim 1 wherein the coupling assembly is in the form of a quick-connect coupling assembly.

11. The fluid coupling assembly as claimed in claim 10 wherein the quick-connect coupling assembly is of a flush-face design.

12. The fluid coupling assembly as claimed in claim 1 wherein the sleeve sub-assembly includes at least one fluid pocket formed in an inside surface of the sleeve sub-assembly at the fluid discharge opening, said fluid pocket designed to assist with closure of the sleeve sub-assembly under the inertia of fluid within the upstream fluid passageway.

13. The fluid coupling assembly as claimed in claim 12 wherein the fluid pocket is in the form of a conical frustum surrounding the fluid discharge opening and having a large diameter end located proximal a downstream end of the upstream fluid passageway, the large diameter end at least in part defining a surface of increased drag forces which assists in closing the sleeve sub-assembly.

14. The fluid coupling assembly as claimed in claim 13 wherein the nozzle body at an upstream edge of the discharge opening includes an undercut to promote the ingress of fluid into a narrow annular channel between the sleeve sub-assembly and the nozzle body, said fluid in the annular channel assisting the sliding movement of the sleeve sub-assembly about the nozzle body.

15. A fluid receiver sub-assembly of a fluid coupling assembly of a dry-break configuration, said receiver sub-assembly comprising:
  i) a receiver body defining a downstream fluid passageway having an inlet;
  ii) a receiver poppet valve including a receiver poppet mounted at a proximal end in a normally-closed state within the receiver body at the inlet, and a poppet support having a cavity within which the receiver poppet a) in its normally-closed state and at its distal end is directly retained, and b) is axially displaced from its normally-closed state for opening of the inlet, the receiver poppet having openings arranged to relieve fluid pressure within the cavity of the poppet support during said axial displacement of the receiver poppet for opening of the inlet, whereby on coupling of the fluid coupling assembly:
1) the receiver poppet is from its normally-closed state displaced axially relative to the receiver body and within the cavity of the poppet support to effect opening of the inlet of the downstream fluid passageway, fluid pressure being relieved from the cavity of the poppet support to the downstream fluid passageway via the openings in the receiver poppet during the axial displacement of the receiver poppet for opening of the inlet;
2) fluid entering the downstream fluid passageway flows through the downstream fluid passageway exiting the fluid receiver sub-assembly.

16. The fluid receiver sub-assembly as claimed in claim 15 also comprising a poppet valve spring housed at least partly within the cavity of the poppet support.

17. The fluid receiver sub-assembly as claimed in claim 15 wherein the poppet support is fixed within the downstream fluid passageway.

18. The fluid receiver sub-assembly as claimed in claim 15 wherein the poppet support includes a mounting section secured internally of the receiver body proximal its outlet, said mounting section including one or more fluid apertures arranged to permit fluid to flow through the downstream fluid passage from outside of the poppet support to the outlet of the receiver body via the fluid apertures.

\* \* \* \* \*